(12) United States Patent
Dahlfort et al.

(10) Patent No.: US 9,191,103 B2
(45) Date of Patent: Nov. 17, 2015

(54) NODE AND METHOD FOR ITERATIVE IMPROVEMENT OF SPECTRAL USE

(75) Inventors: Stefan Dahlfort, Santa Clara, CA (US); Gianmarco Bruno, Genoa (IT); Daniele Ceccarelli, Genoa (IT); Antonio Tartaglia, Latina (IT); Ming Xia, Milpitas, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 146 days.

(21) Appl. No.: 13/819,927

(22) PCT Filed: Jun. 15, 2012

(86) PCT No.: PCT/SE2012/050654
§ 371 (c)(1),
(2), (4) Date: Feb. 28, 2013

(87) PCT Pub. No.: WO2013/169158
PCT Pub. Date: Nov. 14, 2013

(65) Prior Publication Data
US 2014/0193148 A1 Jul. 10, 2014

Related U.S. Application Data

(60) Provisional application No. 61/645,110, filed on May 10, 2012.

(51) Int. Cl.
*H04B 10/073* (2013.01)
*H04B 10/27* (2013.01)
*H04B 10/077* (2013.01)

(52) U.S. Cl.
CPC .......... *H04B 10/073* (2013.01); *H04B 10/0775* (2013.01); *H04B 10/27* (2013.01)

(58) Field of Classification Search
USPC ..................... 398/9, 16, 25, 30–34
See application file for complete search history.

(56) References Cited

U.S. PATENT DOCUMENTS

| 2003/0016411 | A1* | 1/2003 | Zhou et al. ................. 359/110 |
| 2004/0037569 | A1* | 2/2004 | Kamalov et al. ............ 398/162 |
| 2005/0147346 | A1* | 7/2005 | Vaa et al. ..................... 385/27 |
| 2006/0280512 | A1* | 12/2006 | Sato ............................ 398/212 |

(Continued)

FOREIGN PATENT DOCUMENTS

| EP | 1916784 A1 | 4/2008 |
| EP | 1975693 A1 | 10/2008 |

OTHER PUBLICATIONS

Jinno, Masahiko, et al., "Elastic and Adaptive Optical Networks: Possible Adoption Scenarios and Future Standardization Aspects," IEEE Communications Magazine, vol. 49, No. 10, Oct. 1, 2011, pp. 164-172, XP011385330.

(Continued)

*Primary Examiner* — David Payne
*Assistant Examiner* — Casey Kretzer
(74) *Attorney, Agent, or Firm* — Rothwell, Figg, Ernst & Manbeck, P.C.

(57) ABSTRACT

Example embodiments presented herein are directed towards an optical testing node, and method therein, for establishing transmission parameters for optical communications in an iterative manner. The establishment of the transmission parameters may comprise adjusting various parameters such as a modulation scheme, a light path length, and/or a spectral width.

18 Claims, 6 Drawing Sheets

(56) References Cited

U.S. PATENT DOCUMENTS

| | | |
|---|---|---|
| 2009/0196602 A1 | 8/2009 | Saunders et al. |
| 2010/0158531 A1* | 6/2010 | Chung et al. .................. 398/79 |
| 2010/0232789 A1* | 9/2010 | Ji et al. .......................... 398/25 |

OTHER PUBLICATIONS

Jinno, Masahiko, et al, "Distance-Adaptive Spectrum Resource Allocation in Spectrum-Sliced Elastic Optical Path Network," IEEE Communications Magazine, vol. 48, No. 8, Aug. 1, 2010, pp. 138-145' XP011316007.

International Search Report and Written Opinion from PCT/SE2012/050654; dated Feb. 18, 2013, 10 pages.

Eiselt, "Flexible Optical Transport Solutions", ECOC 2010 Workshop WS2, "Petabit Routing: Electronic, Optical or Hybrid? Where to Draw the Line?", Sep. 19, 2010, 23 pages Link: http://www.ecoc2010.org/contents/attached/c20/WS_2_Eiselt.pdf.

Jinno, et al., "Management and Control Aspects of Spectrum Sliced Elastic Optical Path Network (SLICE)", ECOC 2010, Workshop on "Operationalizing Dynamic Transport Networks", Sep. 19, 2010, 22 pages Link: http://www.oiforum.com/public/documents/Sliced_Elastic_Optical_Path_Network_19Sept10_Jinno.pdf.

* cited by examiner

NODE AND METHOD FOR ITERATIVE IMPROVEMENT OF SPECTRAL USE

CROSS-REFERENCE TO RELATED APPLICATIONS

This application is a 35 U.S.C. §371 National Phase Entry Application from PCT/SE2012/050654, filed Jun. 15, 2012, and designating the United States, and claiming priority to U.S. provisional application No. 61/645,110, filed on May 10, 2012. The aforementioned applications are incorporated by reference herein.

TECHNICAL FIELD

Example embodiments presented herein are directed towards an optical testing node, and method therein, for establishing transmission parameters for optical communications in an iterative manner.

BACKGROUND

The focus for DWDM transport systems has, since the inception in the mid 1990's, been on increasing the bitrate per wavelength channel, the transmission distance, and reducing the cost. The transmission of 100 G (and beyond) signals over long distances over SMF has been enabled by a set of technologies like polarization-multiplexed and multi-level signalling, together with coherent detection and digital post-processing. For this reason, Dual-Pol QPSK (Quadrature Phase Shift Keying), 16-QAM (Quadrature Amplitude Modulation) and so on, are attractive solutions for high-speed transmission, both for a single carrier and multi-carrier approach (OFDM). For example, 100 G signals carried by DP-QPSK can be fit into a 50 GHz grid and it is likely that a 400 G signal carried by DP-16-QAM could be fit into a 100 GHz grid. As the spectrum of a single fibre is limited, and traffic per wavelength channel has steadily increased, the issue of spectral use has become increasingly important.

Firstly, this is due to the so-called ITU grid which divides the transmission spectrum into 100 GHz or 50 GHz slots. Thus, if a 10 Gbps channel is upgraded on a 50 GHz slot to 100 Gbps, the 100 G signal will be much more spectrally efficient per bit vs. the 10 G channel. Secondly, as the total traffic demand of the DWDM transport system increases, while new fibres are still very expensive to be deployed, the overall spectral efficiency (SE) becomes an issue.

Thus, in the last couple of years, the field of Elastic optical network has been born. The idea is to allocate as little spectrum as possible to each traffic demand. The traffic demand is simply put as an element on the network traffic matrix between two end nodes. For demands having short transmission distances and few node hops, the allocated spectrum can be made smaller since higher modulation formats can be used (more bits/symbol at the same symbol rate, i.e., more bit/s·Hz), with less effect of filter narrowing from node cascades. Also, there is a fundamental trade-off between spectral efficiency and OSNR as it is well known from communication theory. In other words, when the number of symbols used to encode the information grows and the overall power is kept constant, the average distance between the symbols in the constellation decreases and hence their tolerance to the noise.

SUMMARY

At least one example object of the example embodiments presented herein is to remedy the above mentioned problems.

An example advantages provided by the example embodiments presented herein is the ability to ensure a maximum spectrum utilization by preserving existing low bit rate channels (e.g., 10 G, 40 G, 100 G) when installing new high bit rate channels. A further example advantage is the utilization of a modulation format which provides the best trade-off between spectral efficiency and OSNR tolerance. Specifically, the number of expensive regenerators that need to be utilized may be minimized with a proper allocation of both wavelengths and modulation formats. The example embodiments presented herein have a further advantage of finding a smallest spectrum and shortest path for a given demand in an optical network in an efficient and cost effective manner. Furthermore, the example embodiments presented herein allow for path-adaptive spectrum allocation and introduces the freedom of adjusting spectrum compared with traditional RSA methods.

Thus, some of the example embodiments may be directed towards a method, in an optical testing node, for establishing transmission parameters for optical communications. The method comprises transmitting an optical test signal through an optical network and analysing results of the transmitted optical test signal. The method further comprises adjusting at least one parameter of said optical test signal based on the analysing. The transmitting, analysing and adjusting are performed in an iterative manner.

Some of the example embodiments may be directed towards an optical testing node for establishing transmission parameters for optical communications. The optical testing node comprises transmitting circuitry configured to transmit an optical test signal through an optical network. The optical testing node further comprises processing circuitry configured to analyse results of the transmitted optical test signal. The processing circuitry is further configured to adjust at least one parameter of said optical test signal based on the analysing. The transmitting and processing circuitry are configured to operate in an iterative manner.

DEFINITIONS

Δf Spectral Width in GHz
BPSK Binary Phase Shift Keying
CD Chromatic Dispersion
DP Dual Polarization
DWDM Dense Wavelength Division Multiplexing
FEC Forward Error Correction
FWM Four Wave Mixing
OFDM Orthogonal Frequency Division Multiplexing
OSNR Optical Signal to Noise Ratio
PCE Path Computation Element
PMD Polarization Mode Dispersion
SE Spectral Efficiency
SMF Single Mode Fibre
SNR Signal to Noise Ratio
QAM Quadrature Amplitude Modulation
QPSK Quadrature Phase Shift Keying
ROADM Reconfigurable Optical Add-Drop Multiplexer
RSA Routing and Spectral Assignment
RWA Routing and Wavelength Assignment
WSON Wavelength Switched Optical Network
WSS Wavelength Selective Switch

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

As part of the development of the example embodiments described herein, a problem will first be identified and discussed. Spectral minimal allocation has been described in several research papers. In a larger mesh network, typical for nationwide DWDM networks, the minimal spectral assignment is not trivial (i.e., the "Routing and Spectral Assignment", RSA problem). This is because routing and spectrum allocation are cross affected by each other. Most RSA schemes so far choose to assume a certain (fixed) amount of spectrum independent of the RSA-selected path. In searching for an available spectral slot, some assumption for the demand is made. In order to assure sufficient transmission quality, this assumption typically overestimates the actual spectrum need, and may also disqualify the final "best" path. In addition, assuming fixed amounts of spectrum does not fully exploit all possibilities for RSA, as a found path (short enough) may allow a smaller spectrum. Thus, the minimum spectrum may not be allocated.

The spectrum needed for a transmission path depends on several interacting transmission impairments, which further affect the OSNR performance. A few non-limiting examples of such impairments are provided herein. One such example of an impairment is noise accumulation. The needed signal spectrum is smaller for more-SE modulation formats, such as QPSK, 16QAM, 64 QAM, etc. compared to BPSK for example. This is simply due to the fact that given the same symbol rate (the baud rate) these modulation formats carry more bits per symbol. As signal travels longer distance, the noise will blur the constellation plane corresponding to a decrease of OSNR.

Figure 1:
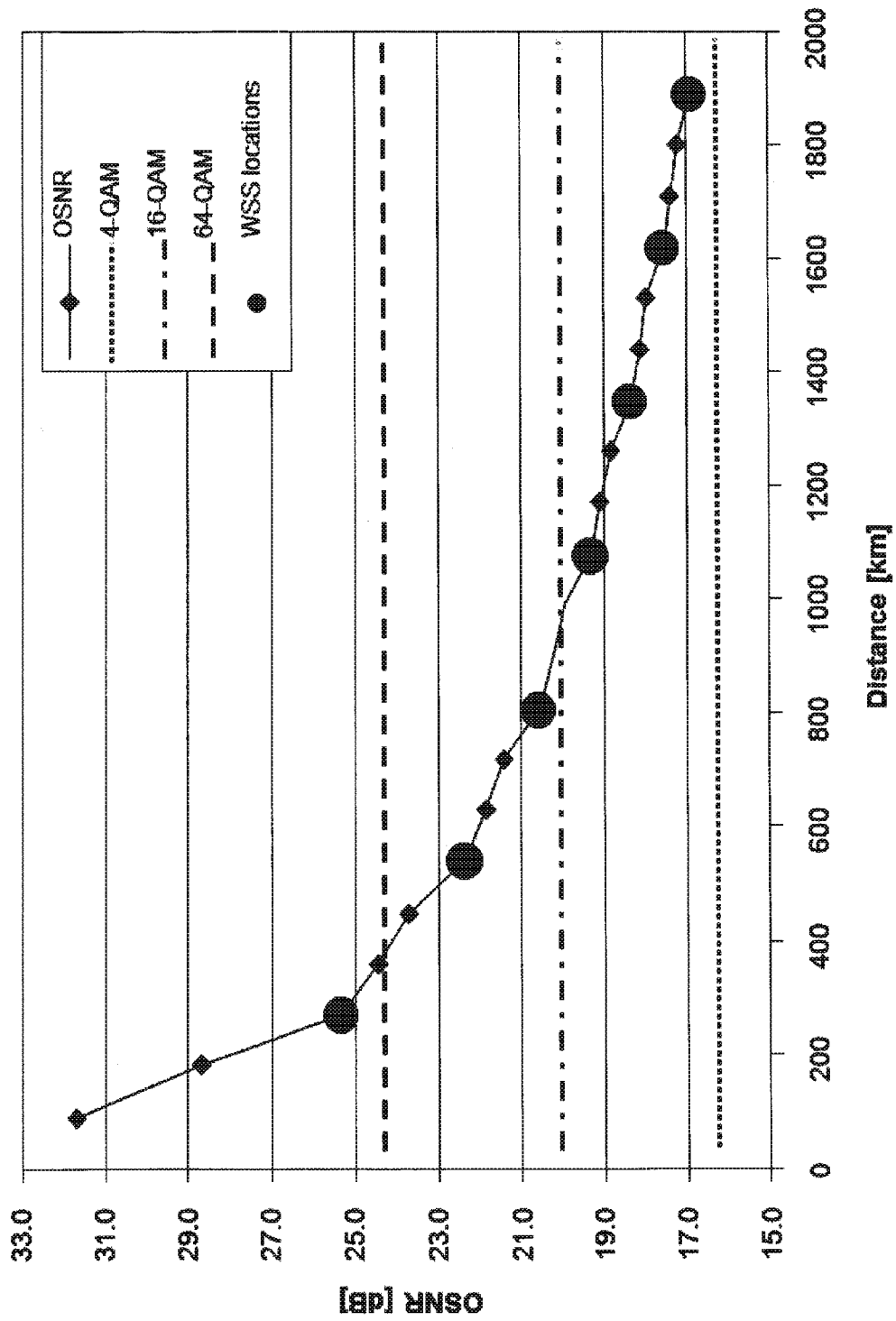
FIG. 1 is a graphical illustration of OSNR over distance for various modulation formats.

Another example impairment is associated with ROADM filters. Since each ROADM filters the channels via WSS's, each node cascade narrows the available spectrum. The overall effect of multiple cascaded ROADMs will be an optical filter with a small passing-through range, which will affect the SNR of a signal that goes through the ROAMDs due to their insertion loss. FIG. 1 illustrates a plot of the OSNR evolution along the optical path with WSS locations highlighted as dark circles. As expected, due to multiple passes (cascades) of optical amplifiers, OSNR levels drop as the optical signal travels greater distances and reaches various WSS's.

Another example impairment is the non-linear interaction between channels. For narrow wavelength channel spacing, the non-linear Kerr effect arises in the fibre waveguide. This effect manifests itself as inter-channel modulation of the refractive index (cross-phase modulation) and frequency shift of photons via four-wave mixing. The FWM may limit a very narrow, spectral-efficient, spectral location of wavelength channels. Since this impairment depends on the allocated channels in the network, thus, not only the effect on the new allocated channel need to be taken into account, but also on co-propagating channels sharing links with the new channel.

As a more SE format is more susceptible to noise, it hence needs higher SNR. Since the OSNR decreases at each optical amplifier and longer transmission distances, a high number of bits/symbol may not be possible for some modulation formats and long-distance multiple-hop transmission. Also, due to the above effects, a spectrum usage for a specific traffic demand is hard to predict, which is an integral part of RSA that will affect routing decisions in the RSA.

A further example impairment is the trade-off between the OSNR and spectral efficiency. For example, in the transmission of a 400 GbE signal with various modulation formats, all employing polarization-multiplexing and coherent detection, it is assumed that electronic post-processing at the receiver end compensates the effects of linear fibre impairments (e.g., PMD and CD), the phase noises of the carrier and the local oscillator, and the frequency mismatch between them. The table below illustrates the trade-offs between performance and implementation constraints for several modulation formats candidate for a single-carrier 400 GbE transport.

| 448 Gb/s polarization-multiplexed square QAM transmission system | | | | |
|---|---|---|---|---|
| | 4-QAM (QPSK) | 16-QAM | 64-QAM | 256-QAM |
| Spectral efficiency | 4 b/s/Hz | 8 b/s/Hz | 12 b/s/Hz | 16 b/s/Hz |
| Bandwidth | 112 GHz | 56 GHz | 37 GHz | 28 GHz |
| OSNR for BER = $10^{-3}$ | 16.3 dB | 20.1 dB | 24.3 dB | 28.9 dB |
| Diff. coding penalty | 2 | 1.67 | 1.43 | 1.27 |
| Laser linewidth | 22.5 MHz | 3.9 MHz | 750 kHz | 110 kHz |
| Sampling rate (T/2-spaced sampling) | 224 GSa/s | 112 GSa/s | 74 GSa/s | 56 GSa/s |
| Effective # of bits (ENOB) | 3.8 | 4.9 | 5.7 | 7.0 |

In providing the table above, it is assumed that the WSS infrastructure is ready for a flexible-grid. Other realistic assumptions for an optical transport system comprise an amplifier spacing of 90 km, a fibre attenuation 0.22 dB/km plus 1 dB overhead, an amplifier noise figure 5.5 dB, one WSS every 3 nodes (e.g., traffic nodes are ~270 km apart), 22 dB WSS loss comprising both switching and levelling, and 0 dBm per channel power.

Thus, one approach is to assume a worst-case modulation format and spectral width ($\Delta f\_start$). However, this is rigid and not spectrally efficient. Furthermore, such an approach may not be achievable due to a long-distance transmission and spectrum constraint.

There are number of studies which address the above mentioned issues. For example, the adaptation of signal constellation vs. link conditions have been explored, which covers the concept of symbol constellation adaptation to link length. However, these solutions do not in any way resolve the bandwidth allocation problem, neither the optimization nor trade-off between reach and bandwidth.

Thus, the example embodiments presented herein may be utilized to establish transmission parameters for optical communications by addressing two important issues: 1) the example embodiments propose a method to iteratively search for the minimum spectrum to be assigned for a traffic demand; and 2) the example embodiments optimize the trade-off between spectral efficiency and OSNR tolerance in a WSON. The example embodiments may iteratively adjust various parameters of an optical test signal to achieve these two issues. Therefore, the example embodiments may be viewed as an extended RWA problem where the method is capable to select a proper Modulation Format and it is aware of the transmission impairments occurring at an optical level.

Figure 2:
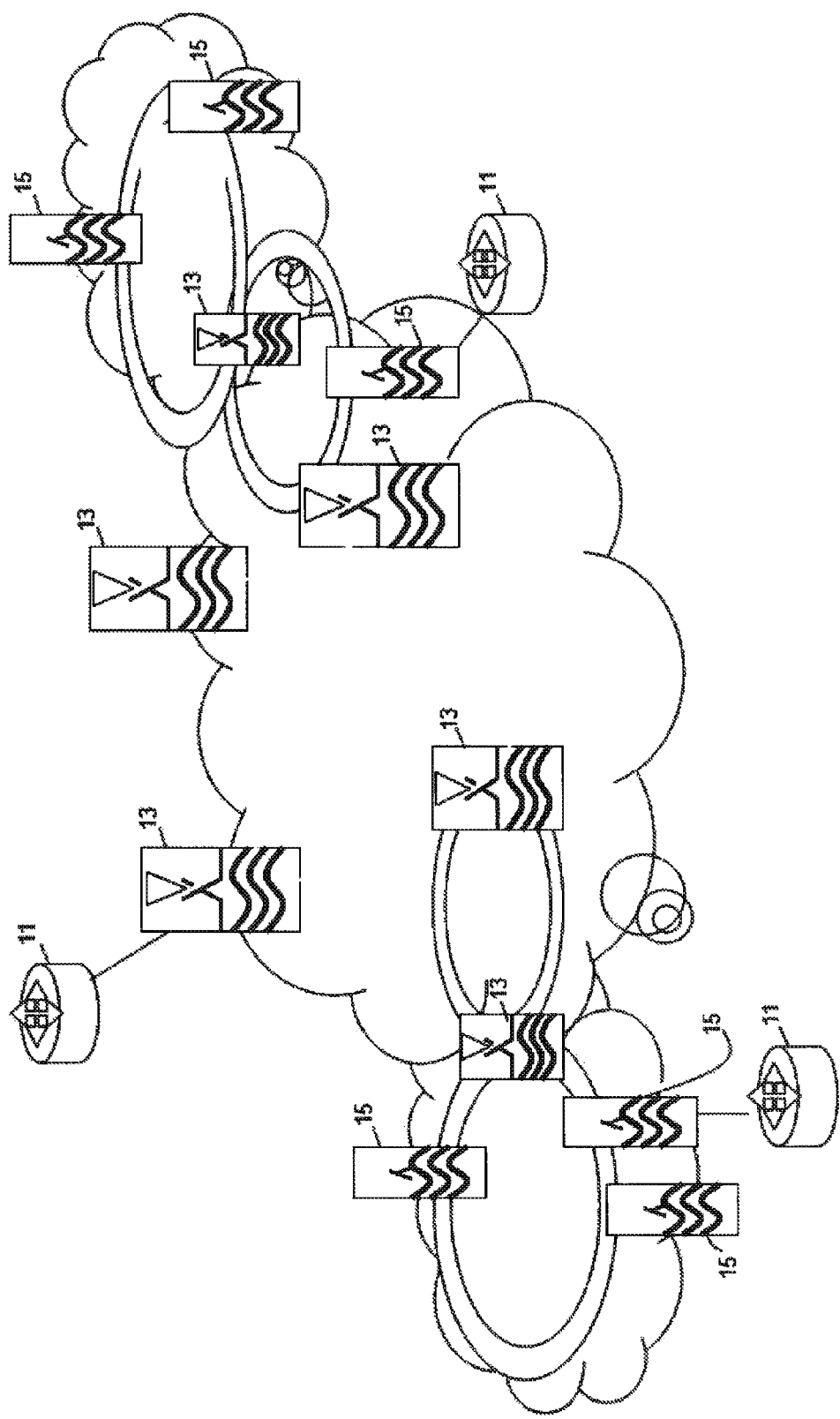
FIG. 2 is an example schematic of an optical network.

FIG. 2 illustrates an example of an optical transport network, comprising IP-routers 11, ROADMs 13 and OADMs 15. The IP-routers are typically considered clients to the optical transport network and can be equipped with colored optics (long-haul capable) or grey optics connected to transporter functions of the ROADMs. The OSDMs are lower cost alternatives for adding/dropping wavelength channels in the optical transport network rings. The optical transport network may utilize the example embodiments in establishing transmission parameters for optical communications. The optical network may comprise any number of optical testing nodes, which may be placed at various end points for testing an optical signal at DWDM ports. The optical testing nodes may also be placed at various IP-routers 11 or ROADMs 13. The optical testing nodes may transmit and analyse optical test signals featuring varying parameters to determine the most optimal parameters to be used for transmission. It should be appreciated that the optical testing node may be a standalone node or the functionality of the optical testing node may be part of any of, or any number of, IP-routers 11 or ROAMs 13.

According to some of the example embodiments, two iterative processes may be performed sequentially in order to find three optimal parameters. Generally, the iterative process may be used to identify an optimal modulation format, optical path length, and/or spectral width.

According to some of the example embodiments, the PCE, or an optical testing node, may be requested to route one or more lightpaths, e.g., 400 Gbps. Some of the lightpaths may be marked as f-paths, i.e., lightpaths which comprise the flexibility to select a different modulation format. The path allocation may start from the longest connections (with the lowest OSNR) using the first modulation format meeting the OSNR requirements in order to minimize the need for regeneration points. To check if the first modulation format that can meet the OSNR requirement, a test signal may be sent from the source to destination nodes over the computed paths. This test signal may be used to find the possible modulation formats over the link. The transmitter/receiver pair may then be used for the actual traffic demand, after the RSA finalizes its decision. After the signal has been tested OK for OSNR estimation, an initial modulation format (e.g., the first feasible modulation format in the list) may be identified and the traffic demand may be mapped into a spectrum width $\Delta f\_start$.

The $\Delta f$ is obtained by including both the actual spectrum width of the signal and the two-side spectrum guardbands (which may be taken from the signal test). It is also possible to exploit performance feedback from the receive end (e.g., with pre-FEC error statistics), carried either by Control Plane or by in-band signalling, to track the spectrum guardband for later assigned signals. An implementation of the example embodiments may be detected by checking transmitters. If there are multiple (>=2) attempts of setting up the same connections, it is in the iteration phase. The path allocation is performed considering the spectrum constraints, i.e. the number of adjacent spectrum slots to be associated to the chosen modulation format.

The example embodiments may be used to further proceed to spectrum optimization if it is possible to allocate the requested paths. Otherwise, two scenarios can happen: Case 1) failure due to poor OSNR for a set of lightpaths marked as i-lightpaths or Case 2) failure due to lack of spectrum for a set of lightpaths marked as j-lightpaths.

With respect to Case 1): according to some of the example embodiments, the i-lightpath may be split into sub-paths using one or more regenerators. Due to the fact that the failure occurred using the most OSNR tolerant modulation format, the RWA process is run again trying to allocate such lightpaths using the same modulation format.

With respect to Case 2): according to some of the example embodiments, the j-lightpaths may be associated to the next modulation format. The next modulation format may be a modulation format with a lower OSNR tolerance and better spectral efficiency with respect to the previous modulation format. Additional regenerators are not needed as a result of the change of modulation.

Thereafter, the RWA algorithm may be performed again. The process may be run recursively on all the paths moving from the one with stricter OSNR requirements to the one with weaker OSNR requirements. Any time that a failure occurs, the process may be run again using the next modulation format.

It is possible that not all the paths can be allocated with any available modulation format. In this case the example embodiments may be utilized to return the reason for the failure. When an optimized $\Delta f$ is identified, spectrum will be allocated for the request for setting up a real signal, and the provisioning process is done. $\Delta f$ will not be changed beyond this point.

In the case where a path with $\Delta f\_start$ spectrum can be found, a further transmission analysis, taking into account the current route selection and the impairments listed above, can be performed. In the case where this analysis shows a narrower spectrum can be used, $\Delta f\_improve$, this spectrum will be used as an input for the next iteration of the RSA to be performed.

Figure 3:
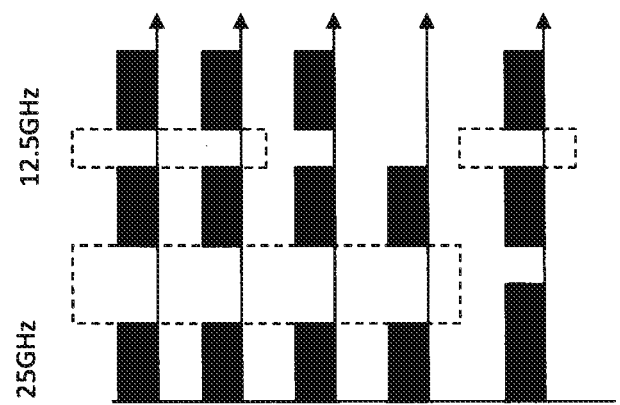
FIG. 3 is an illustrative example of RSA.
Figure 3:
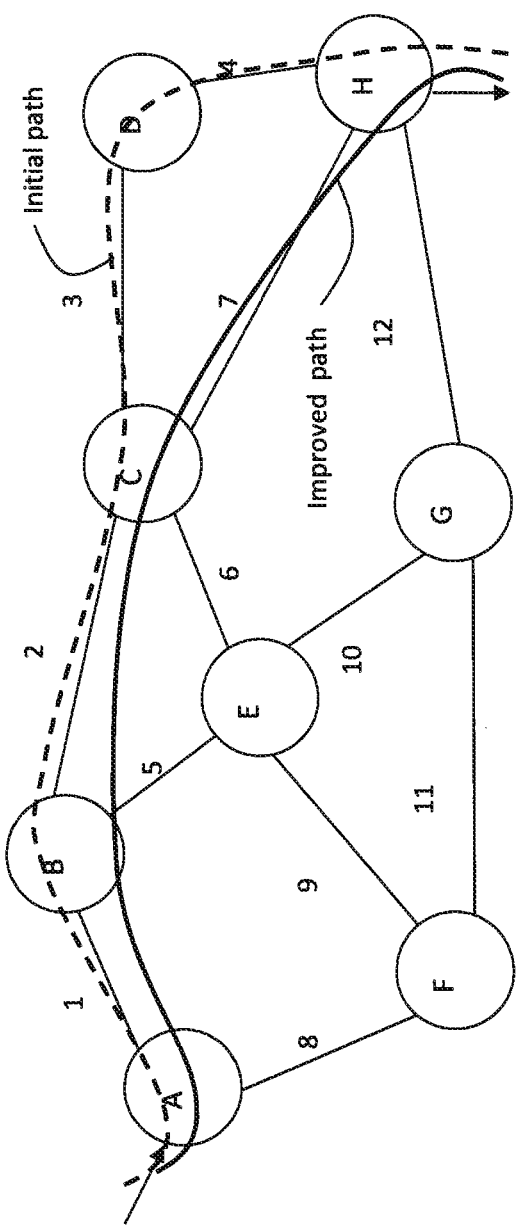

FIG. 3 illustrates an example of RSA in a network. The spectral allocation is illustrated to the right, where an initial estimate of 25 GHz spectral allocation is assumed to compute the initial path using links 1, 2, 3, and 4. With a further transmission analysis (e.g., of the test signal), it is found only 12.5 GHz is needed. This smaller spectral need will qualify a shorter path over links 1, 2, and 7 which does not support a 25 GHz allocation. If the improvement step is successful, further iterations may be performed until no narrower spectrum and/or shorter path may be found.

Figure 4:
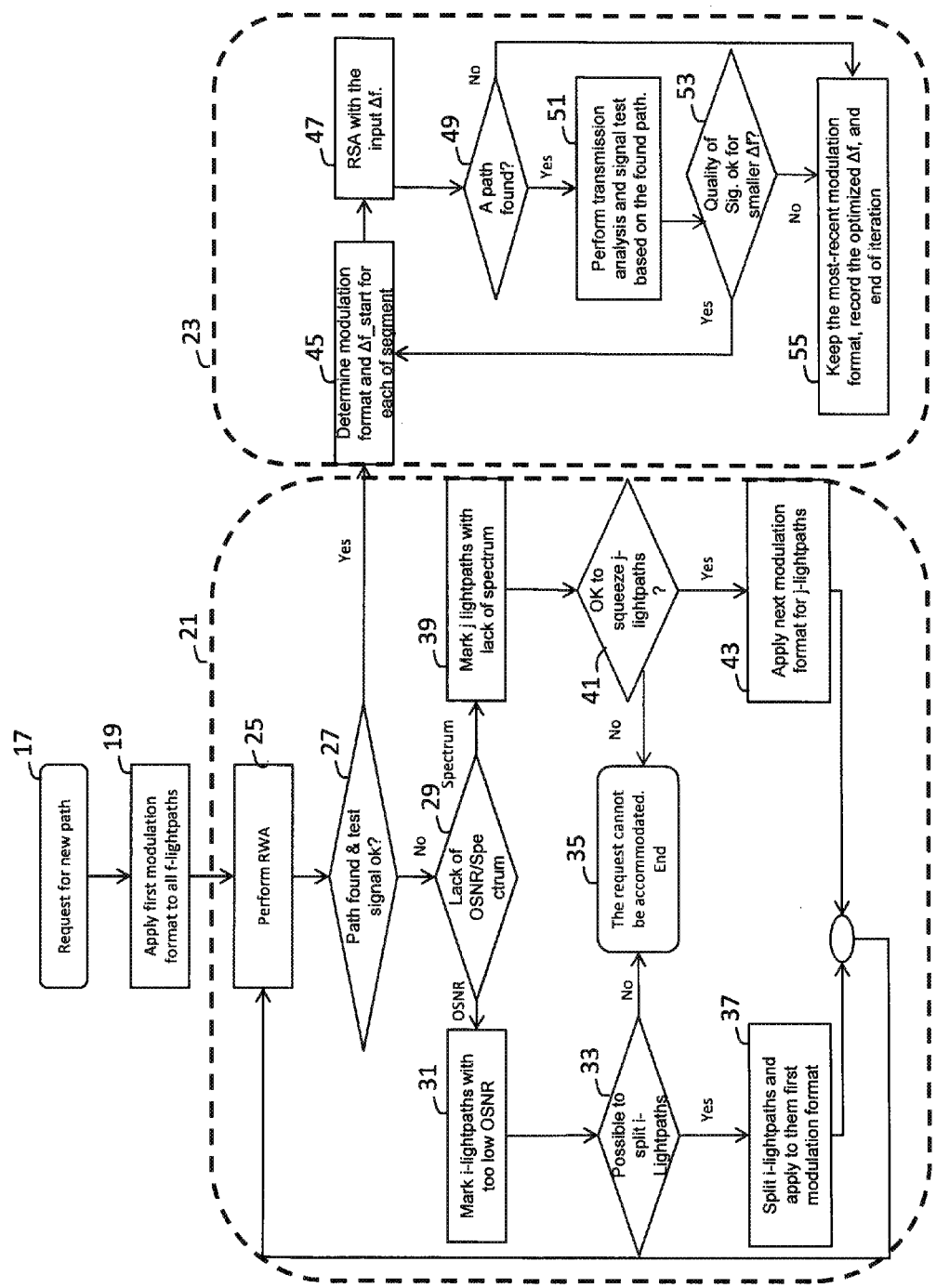
FIG. 4 is a state diagram illustrating some of the example embodiments presented herein.

FIG. 4 illustrates a state diagram depicting various example steps of the example embodiments described above. First, a request for a new path computation or determination may be received (state 17). The request may be sent from a PCE to route one or more light paths, e.g., 400 Gbps. Some of the lightpaths may be marked (e.g., f-lightpaths) as comprising the flexibility to select a different modulation format. Such lightpaths may be utilized by the iterative processes.

Thereafter, the request or traffic demand may be mapped to an initial (e.g., the first in a modulation format list) modulation format with a spectrum width of Δf_start (state 19). An example modulation format list may be {4-QAM (QPSK), 16-QAM, 64-QAM, 256-QAM}. The modulation format list may be an ordered list such that the first or leftmost modulation format in the list is chosen first. According to some example embodiments, the modulation format list may be ordered according to modulation formats with increasing spectral efficiencies. Thereafter, during the iterative process, other modulation formats in the list may be chosen in subsequent order.

Upon the application of the first modulation format, a first of two iterative processes may commence (state 21). The first iterative process (state 21) may be utilized for establishing an optimal modulation format and lightpath. First, a RWA is performed to establish an optical route for the optical test signal with the chosen modulation format (state 25). Thereafter, an evaluation is made as to whether an optical path has been found and if the optical test signal has been received (state 27). If the path has been found and the optical test signal detected, this means that a suitable optical route with a lowest possible modulation format (in terms of spectral efficiency) has been obtained. Thus, the second iterative process (state 23) may commence.

If the path has not been found and the optical test signal has not been detected, a second evaluation may be made. The second evaluation may determine if the path or signal failure is due to a lack of OSNR or a lack of spectrum (state 29). If the optical path has not been found, the failure is due to a lack of spectrum. If the optical test signal has not been detected, the failure is due to a lack of OSNR. If the optical test signal has not been detected and the failure is due to a lack of OSNR, lightpaths which have a low OSNR may be marked (e.g., i-lightpaths) (state 31).

Thereafter, an evaluation may be made as to whether the marked lightpaths (e.g., i-lightpaths) may be split or if additional hops or reconfigurations may be added in the optical path (state 33). If it is determined that the lightpaths (e.g., i-lightpaths) cannot be split, the request may not be accommodated and the iterative process may end (state 35). If it is determined that the lightpaths may be split, the lightpaths which have been marked (i-lightpaths) will be split and the first modulation format (of the modulation list) may be applied (state 37). It should be appreciated that the lightpaths may be split in any manner or number. Such splitting may be reconfigurable depending, for example, on the type of traffic demand or request which is received. Upon splitting the lightpaths, the iterative process may begin again with state 25.

If this modulation format cannot be successfully applied, the example embodiments may try to divide the end-to-end request into a number of segments with regenerators connecting them, to relax the request's OSNR requirement if initially the OSNR requirement cannot be satisfied; or the example embodiments may try a more-compact modulation format to squeeze the spectrum demand, if initially no sufficient spectrum slot could be found.

If the optical path has not been found and the failure is due to a lack of spectrum, lightpaths which are associated with the lack of spectrum may be marked (e.g., j-lightpaths) (state 39). Thereafter, an evaluation may be made as to whether the marked lightpaths (e.g., j-lightpaths) may be squeezed (e.g., in terms of spectral width) or if a modulation format with a higher spectral efficiency may be applied (state 41). If it is determined that the lightpaths (e.g., j-lightpaths) cannot be squeezed, the request may not be accommodated and the iterative process may end (state 35). If it is determined that the lightpaths may be squeezed, the next modulation format of the modulation format list may be applied for the marked lightpaths (e.g., j-lightpaths) (state 43). Upon squeezing the lightpaths, the iterative process may begin again with state 25.

If an optimal lightpath and modulation format has been obtained upon the evaluation provided by state 27, the second iterative process (state 23) may commence. The second iterative process may be utilized to search for an optimal spectral width Δf. During the second iterative process a starting spectral width Δf_start for each segment of the optical path may be identified (state 45). Non-limiting examples of Δf_start may be 3.125, 6.25, and/or 12.5 GHz. According to some of the example embodiments, the value of Δf_start may depend on the modulation format which has been chosen for each respective segment in the first iterative process (state 21). Thus, each modulation format may have an associated Δf_start which may be a worst case starting spectral width input for the second iterative process (state 23).

Upon identifying Δf_start for each optical segment, an RSA, for example as illustrated in FIG. 3, may be performed for each segment with Δf_start as an input (state 47). The RSA may be used to compute an optical route. Upon performing the RSA an evaluation may be made as to whether an optical path has been found (state 49). If an optical path has been found, a transmission analysis and signal test based on the found path may be performed (state 51).

Based on the analysis and test results, a second evaluation may be performed. The second evaluation may identify if the quality of the signal is sufficient enough for using a smaller spectral width Δf (state 53). If the quality of the signal is sufficient enough for using a smaller spectral width, another evaluation may be made with respect to the modulation format of the respective optical segment (state 45).

According to some of the example embodiments, each modulation format may have an ordered list of acceptable spectral widths to be used in the second iterative process. Thus, if the determination of state 53 is to proceed with a smaller spectral width, a next smallest spectral width Δf_improve may be determined in state 45 with the use of an ordered list associated with the respective modulation format of the optical segment. Non-limiting examples of Δf_improve may be 3.125, 6.25, and/or 12.5 GHz. Thereafter, the iterative process will begin again.

During iteration, a smaller Δf_improve may be potentially found by establishing a test signal across the network. The test signal may be used to search for an improved transmission parameter set. If such a smaller Δf_improve may be found, another RSA may be performed to find a more SE assignment, in terms of both less spectrum usage and shorter path. The iteration may continue until no better assignment (evaluated by both spectrum usage and path) can be found.

If a path is not found with the new spectral width Δf_improve (state 49) or if it is determined that the signal quality is not sufficient enough to use a smaller spectral width (state 53), the second iterative process may end. Upon the end of the second iterative process, the most-recent modulation format and the smallest spectral width which provided an optical path may be utilized as the optimal spectral width (state 55).

Figure 5:
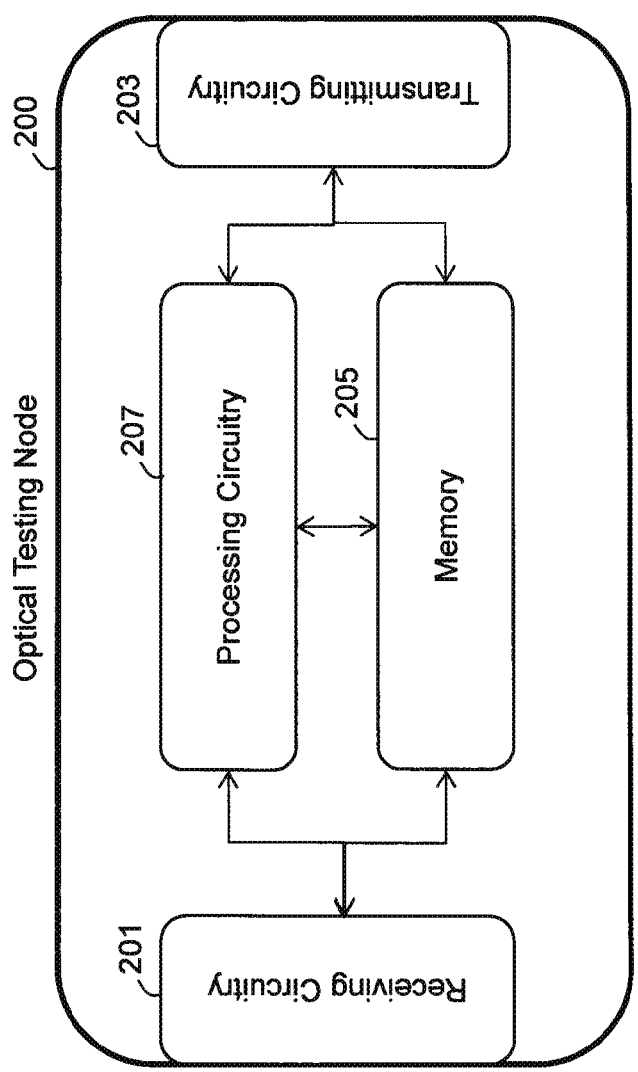
FIG. 5 is an example node configuration of an optical testing node, according to some of the example embodiments.

FIG. 5 illustrates an example optical testing node 200 that may utilize the example embodiments discussed herein. It should be appreciated that the optical testing node 200 may be a standalone node or the functionality of the optical testing node 200 may be comprised in any of, or any number of, IP-routers 11 or ROAMs 13, as shown in FIG. 2.

The optical testing node 200 may comprise any number of communication ports or circuitry, for example receiving circuitry 201 and transmitting circuitry 203. The communication ports or circuitry may be configured to receive and transmit any form of communications data or instructions. It should be appreciated that the optical testing node 200 may alternatively comprise a single transceiver port or circuitry. It should further be appreciated that the communication or transceiver port or circuitry may be in the form of any input/output communications port or circuitry known in the art.

The optical testing node 200 may further comprise at least one memory unit 205. The memory unit 205 may be configured to store received, transmitted, and/or measured data of any kind and/or executable program instructions. The memory unit 205 may be any suitable type of computer readable memory and may be of a volatile and/or non-volatile type.

The optical testing node 200 may also comprise processing circuitry 207 that may be configured to analyze test signals, select new testing and/or signal parameters, etc. It should be appreciated that the processing circuitry 207 may be any suitable type of computation unit, e.g. a microprocessor, digital signal processor (DSP), field programmable gate array (FPGA), or application specific integrated circuit (ASIC). It should also be appreciated that the processing circuitry 207 need not be comprised as a single unit. The processing circuitry 207 may be comprised as any number of units or circuitry.

Figure 6:
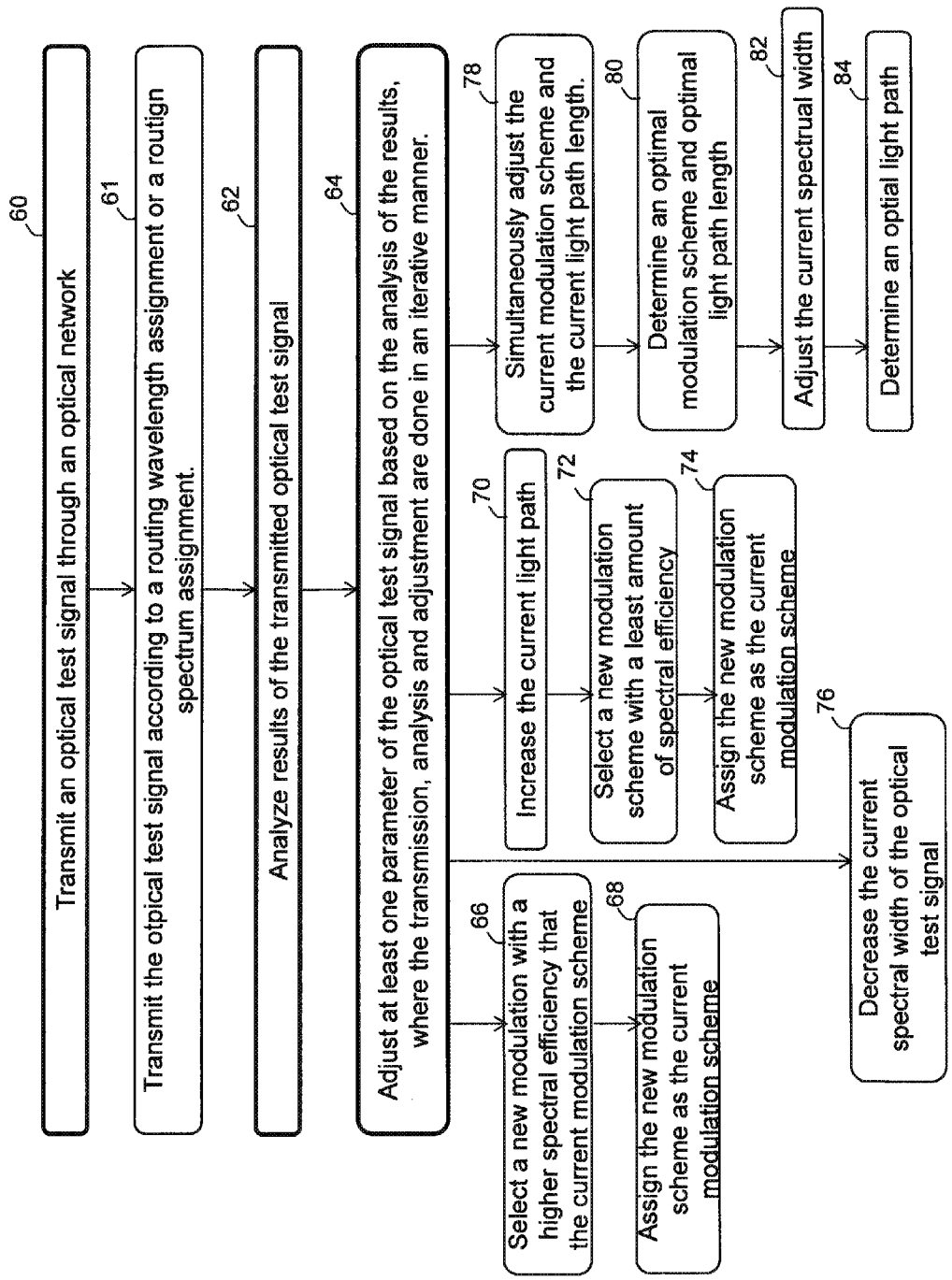
FIG. 6 is a flow diagram depicting example operations of the optical testing node of FIG. 5, according to some of the example embodiments.

FIG. 6 illustrates a flow diagram depicting example operations which may be taken by the optical testing node 200 of FIG. 5. It should also be appreciated that FIG. 6 comprises some operations which are illustrated with a darker border and some operations which are illustrated with a lighter border. The operations which are comprised in a darker border are operations which are comprised in the broadest example embodiment. The operations which are comprised in a lighter border are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

Operation 60

The optical testing node transmits 60 an optical test signal through an optical network. The transmitting circuitry 203 transmits the optical test signal.

Example Operation 61

According to some of the example embodiments, the transmitting 60 may further comprise transmitting 61 the optical test signal according to a routing wavelength assignment or a routing spectrum assignment. The transmitting circuitry 203 may be configured to transmit the optical test signal according to the routing wavelength assignment or the routing spectrum assignment.

Operation 62

The optical testing node is further configured to analyze 62 results of the transmitted optical test signal. The processing circuitry 207 is configured to analyze the results of the transmitted optical test signal.

Operation 64

The optical testing node 200 is also configured to adjust 64 at least one parameter of the optical test signal based on the analyzing 62. The transmitting 60, analyzing 62, and the adjusting 64 are performed in an iterative manner. The processing circuitry 207 is configured to adjust the at least one parameter of the optical test signal based on the analyzing 62. According to some of the example embodiments, the at least one parameter may be a current modulation scheme, a current light path length, and/or a current spectral width of the optical test signal.

Example Operation 66

According to some of the example embodiments, upon the analyzing 62, if the transmitted optical test signal is not detected due to a lack of spectral width, the adjusting 64 may further comprise selecting 66 a new modulation scheme, as described in states 39, 41, and 43 of FIG. 4. The selection of the new modulation scheme may be made from a sub-set of modulation schemes such that the new modulation scheme has a higher spectral efficiency than the current modulation scheme. The processing circuitry 207 may be configured to select the new modulation scheme. According to some of the example embodiments, the sub-set of modulation schemes may comprise at least one of a binary phase-shift keying, a dual polarization binary phase-shift keying, a dual polarization quadrature phase-shift keying, and/or a dual polarization 16 quadrature amplitude modulation.

Example Operation 68

According to some of the example embodiments, upon selecting 66 the new modulation scheme, the optical testing node 200 may be further configured to assign 68 the new modulation scheme as the current modulation scheme. The processing circuitry 207 may be configured to assign the new modulation scheme as the current modulation scheme.

Example Operation 70

According to some of the example embodiments, upon the analyzing 62, if the transmitted optical test signal is not detected due to a low optical signal to noise ratio, the adjusting 64 may further comprise increasing 70 the current light path length, as described in states 31, 33, and 37 of FIG. 4. The processing circuitry 207 may be configured to increase the current light path length.

Example Operation 72

According to some of the example embodiments, upon increasing 70 the current light path length, the optical testing node 200 may be further configured to select 72 a new modulation scheme (e.g., state 37 of FIG. 4). The new modulation scheme may be selected from a sub-set of modulation schemes, such that the new modulation scheme comprises a least amount of spectral efficiency from the sub-set of modulation schemes. The processing circuitry 207 may be configured to select the new modulation scheme. According to some of the example embodiments, the sub-set of modulation schemes may comprise at least one of a binary phase-shift keying, a dual polarization binary phase-shift keying, a dual polarization quadrature phase-shift keying, and/or a dual polarization 16 quadrature amplitude modulation.

Example Operation 74

According to some of the example embodiments, upon selecting 72 a new modulation scheme, the optical testing node 200 may be further configured to assign 74 the new modulation scheme as the current modulation scheme. The processing circuitry 207 may be configured to assign the new modulation scheme as the current modulation scheme.

Example Operation 76

According to some of the example embodiments, the adjusting 64 may further comprising decreasing 76 the current spectral width of the optical test signal, for example as described by the second iterative process 23 of FIG. 4. The processing circuitry 207 may be configured to decrease the current spectral width of the optical test signal.

Example Operation 78

According to some of the example embodiments, the adjusting 64 may further comprising simultaneously adjusting 78 the current modulation schemed and the current light path length, for example as described by the first iterative process 21 of FIG. 4. The processing circuitry 207 may be configured to simultaneously adjust the current modulation scheme and the current light path length.

Example Operation 80

According to some of the example embodiment, upon simultaneously adjusting 78, the optical testing node 200 may be further configured to determine 80 an optimal modulation scheme and an optimal light path length. The optimal modulation scheme and the optimal light path length may be the end result of the first iterative process 21 described in FIG. 4. The determination 80 may be made such that when the optical test signal is detected, the current modulation scheme and the current light path length equal the optimal modulation scheme and the optimal light path length, respectively. The processing circuitry 207 may be configured to determine the optimal modulation scheme and the optimal light path length.

Example Operation 82

According to some of the example embodiments, upon determining 80 the optimal modulation scheme and the optimal light path length, the adjusting 64 may further comprising adjusting 82 the current spectral width. The processing circuitry 207 may be configured to adjust the current spectral width. Thus, as described in FIG. 4, once the first iterative process 21 is completed the second iterative process 23 may begin using the results of the first iterative process.

Example Operation 84

According to some of the example embodiments, upon adjusting 82, the optical testing node 200 may be further configured to determine 84 an optimal light path length, as described by state 47 of FIG. 4. The determination 84 may be made such that when the optical test signal is not detected, the optimal spectral width is a next highest spectral width from a sub-set of spectral widths, compared to the current spectral width, as described by states 49 and 55 of FIG. 4. The processing circuitry 207 may be configured to determine the optimal light path length.

The foregoing description of embodiments of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, in an optical testing node, for establishing transmission parameters for optical communications, the method comprising:

transmitting an optical test signal through an optical network;

analysing results of the transmitted optical test signal; and adjusting at least one parameter of said optical test signal based on the analysing, wherein said transmitting, analysing and adjusting are performed in an iterative manner, said optical test signal has a modulation scheme, a light path length, and a spectral width, and adjusting at least one parameter based on the analysing comprises adjusting at least one of the following based on the analysing: the modulation scheme, the light path length, and the spectral width of the optical signal, wherein upon analysing the results, if the transmitted optical test signal is not detected due to a low optical signal to noise ratio, the adjusting further comprises:

increasing the current light path length;

selecting a new modulation scheme, from a sub-set of modulation schemes, such that the new modulation scheme comprises a least amount of spectral efficiency from the sub-set of modulation schemes; and thereafter, assigning the new modulation scheme as the current modulation scheme.

2. The method of claim 1, wherein adjusting at least one parameter comprises adjusting the modulation scheme by selecting a new modulation scheme from a set of modulation schemes comprising: binary phase-shift keying, dual polarization binary phase-shift keying, dual polarization quadrature phase-shift keying, and dual polarization 16 quadrature amplitude modulation.

3. The method of claim 1, wherein the transmitting further comprising transmitting the optical test signal according to a routing wavelength assignment or a routing spectrum assignment.

4. The method of claim 1, wherein analysing results of the transmitted optical test signal comprises determining whether the transmitted optical test signal is not detected due to a lack of spectral width, and adjusting at least one parameter of said optical test signal based on the analysing comprises selecting a new modulation scheme, from a sub-set of modulation schemes, as a result of determining that the transmitted optical test signal is not detected due to a lack of spectral width, wherein the new modulation scheme has a higher spectral efficiency than the current modulation scheme; and thereafter, assigning the new modulation scheme as the current modulation scheme.

5. The method of claim 4, wherein the sub-set of modulation schemes comprises at least one of a binary phase-shift keying, a dual polarization binary phase-shift keying, a dual polarization quadrature phase-shift keying, and/or a dual polarization 16 quadrature amplitude modulation.

6. The method of claim 1, wherein upon analysing the results, if the optical test signal is detected, the adjusting comprises decreasing the current spectral width of the optical test signal.

7. The method of claim 1, wherein adjusting at least one parameter comprises adjusting the light path length.

8. A method, in an optical testing mode, for establishing transmission parameters for optical communications, the method comprising;
   transmitting an optical test signal through an optical network;
   analysing results of the transmitted optical test signal; and
   adjusting at least one parameter of said optical test signal based on the analysing, wherein
   said transmitting, analysing and adjusting are performed in an iterative manner,
   said optical test signal has a modulation scheme, a light path length, and a spectral width, and
   adjusting at least one parameter comprises adjusting one of: the modulation scheme, the light path length, and the spectral width of the optical signal, wherein the adjusting further comprises:
   simultaneously adjusting the current modulation scheme and the current light path length; and
   determining an optimal modulation scheme and optimal light path length, wherein when the optical test signal is detected, the current modulation scheme and the current light path length equal the optimal modulation scheme and optimal light path length, respectively.

9. The method of claim 8, wherein upon determining the optimal modulation scheme and the optimal light path length, the adjusting further comprises:
   adjusting the current spectral width; and
   determining an optimal light path length, such that when the optical test signal is not detected, the optimal spectral width is a next highest spectral width, from a sub-set of spectral widths, compared to the current spectral width.

10. An optical testing node for establishing transmission parameters for optical communications, the optical testing node comprising:
    transmitting circuitry configured to transmit an optical test signal through an optical network;
    processing circuitry configured to analyse results of the transmitted optical test signal; and
    the processing circuitry further configured to adjust at least one parameter of said optical test signal based on the analysing, wherein
    said transmitting and processing circuitry are configured to operate in an iterative manner,
    said optical test signal has a modulation scheme, a light path length, and a spectral width, and
    the processing circuitry is configured to adjust said at least one parameter based on the analysing by adjusting one of: the modulation scheme, the light path length, and the spectral width of the optical signal, wherein
    upon analysing the results, if the transmitted optical test signal is not detected due to a low optical signal to noise ratio, the processing circuitry is further configured to increase the current light path length, the processing circuitry is also configured to select a new modulation scheme, from a sub-set of modulation schemes, such that the new modulation scheme comprises a least amount of spectral efficiency from the sub-set of modulation schemes; and thereafter the processing circuitry is further configured to assign the new modulation scheme as the current modulation scheme.

11. The optical testing node of claim 10, wherein the processing circuitry is configured to adjust said at least one parameter by adjusting the modulation scheme.

12. The optical testing node of claim 11, wherein adjusting the modulation scheme comprises selecting a new modulation scheme from a set of modulation schemes comprising: binary phase-shift keying, a dual polarization binary phase-shift keying, a dual polarization quadrature phase-shift keying, and/or a dual polarization 16 quadrature amplitude modulation.

13. The optical testing node of claim 10, wherein the transmitting circuitry is configured to transmit the optical testing signal according a routing wavelength assignment or a routing spectrum assignment.

14. The optical testing node of claim 10, wherein upon analysing the results, if the transmitted optical test signal is not detected due to a lack of spectral width, the processing circuitry is further configured select a new modulation scheme, from a sub-set of modulation schemes, such that the new modulation scheme has a higher spectral efficiency than the current modulation scheme; and thereafter, the processing circuitry is also configured to assign the new modulation scheme as the current modulation scheme.

15. The optical testing node of claim 10, wherein upon analysing the results, if the optical test signal is detected, the processing circuitry is further configured to decrease the current spectral width of the optical test signal.

16. The optical testing node of claim 10, wherein the processing circuitry is configured to adjust said at least one parameter by adjusting the light path length.

17. An optical testing node for establishing transmission parameters for optical communications, the optical testing node comprising:
    transmitting circuitry configured to transmit an optical test signal through an optical network;
    processing circuitry configured to analyse results of the transmitted optical test signal; and
    the processing circuitry further configured to adjust at least one parameter of said optical test signal based on the analysing, wherein
    said transmitting and processing circuitry are configured to operate in an iterative manner,
    said optical test signal has a modulation scheme, a light path length, and a spectral width, and
    the processing circuitry is configured to adjust said at least one parameter by adjusting one of: the modulation scheme, the light path length, and the spectral width of the optical signal, wherein the processing circuitry is further configured to simultaneously adjust the current modulation scheme and the current light path length, and the processing circuitry is also configured to determine an optimal modulation scheme and optimal light path length, wherein when the optical test signal is detected, the current modulation scheme and the current light path length equal the optimal modulation scheme and optimal light path length, respectively.

18. The optical testing node of claim 17, wherein upon determining the optimal modulation scheme and the optimal light path length, the processing circuitry is further configured to adjust the current spectral width, and the processing circuitry is also configured to determine an optimal light path length, such that when the optical test signal is not detected, the optimal spectral width is a next highest spectral width, from a sub-set of spectral widths, compared to the current spectral width.

* * * * *